US007917137B2

(12) United States Patent
Suronen et al.

(10) Patent No.: US 7,917,137 B2
(45) Date of Patent: Mar. 29, 2011

(54) OPTIMIZATION OF UPLINK RESOURCE GRANT PROCEDURE AND APPARATUS

(75) Inventors: Antti-Eemeli Suronen, Oulu (FI); Jarkko T. Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 74 days.

(21) Appl. No.: 12/322,543

(22) Filed: Feb. 4, 2009

(65) Prior Publication Data

US 2010/0197313 A1    Aug. 5, 2010

(51) Int. Cl.
*H04W 4/00* (2009.01)
*H04W 36/00* (2009.01)
*H04B 7/00* (2006.01)
*H04B 1/38* (2006.01)

(52) U.S. Cl. ............ 455/432.1; 455/436; 455/442; 455/518; 455/560; 370/312; 370/329; 370/331; 370/335; 370/352; 380/29

(58) Field of Classification Search .......... 455/432.1, 455/434, 436, 450, 518, 522, 560, 442; 370/329, 370/335, 352, 312, 331; 380/29
See application file for complete search history.

(56) References Cited

U.S. PATENT DOCUMENTS

| 7,076,248 | B2 * | 7/2006 | Amirijoo et al. ............ 455/432.1 |
| 7,508,792 | B2 * | 3/2009 | Petrovic et al. ............... 370/331 |
| 2002/0111180 | A1 * | 8/2002 | Hogan et al. .................. 455/518 |
| 2003/0050097 | A1 * | 3/2003 | Amirijoo et al. .............. 455/560 |
| 2004/0017798 | A1 * | 1/2004 | Hurtta et al. .................. 370/352 |
| 2007/0081492 | A1 * | 4/2007 | Petrovic et al. ............... 370/331 |
| 2008/0130588 | A1 * | 6/2008 | Jeong et al. ................... 370/335 |
| 2008/0192925 | A1 * | 8/2008 | Sachs et al. ..................... 380/29 |
| 2008/0214193 | A1 * | 9/2008 | Jeong et al. ................... 455/436 |
| 2008/0253323 | A1 * | 10/2008 | Fischer ......................... 370/329 |
| 2008/0268852 | A1 * | 10/2008 | Petrovic et al. ............... 455/442 |
| 2009/0052364 | A1 * | 2/2009 | Gonsa et al. .................. 370/312 |
| 2009/0052388 | A1 * | 2/2009 | Kim et al. ..................... 370/329 |
| 2009/0131053 | A1 * | 5/2009 | Sachs et al. ................... 455/436 |

(Continued)

FOREIGN PATENT DOCUMENTS

| WO | WO2006/126920 A1 | 11/2006 |
| WO | WO2008/054114 A2 | 5/2008 |
| WO | WO2009/126078 A1 | 10/2009 |

OTHER PUBLICATIONS

"RRC processing delay", 3GPP TSG-RAN WG2 Meeting #64-bis, R2-090820, Jan. 2009, 3 pgs.

(Continued)

*Primary Examiner* — William D Cumming
(74) *Attorney, Agent, or Firm* — Harrington & Smith

(57) ABSTRACT

According to an embodiment of the invention, a method includes receiving a radio resource control message for which a response message is required to be transmitted to a network access node; performing at least one procedure specified by the radio resource control message; and transmitting the response message using network radio resources that are received in a non-solicited manner from the network access node. According to another embodiment of the invention an apparatus includes a controller configured to operate with a radio frequency receiver and a radio frequency transmitter. The controller is further configured to transmit a radio resource control message for which a response message is required to be received from a user equipment, and to specify to the user equipment in an un-solicited manner those network radio resources to be used by the user equipment for transmitting the response message.

11 Claims, 8 Drawing Sheets

U.S. PATENT DOCUMENTS

| | | | | |
|---|---|---|---|---|
| 2009/0207810 A1* | 8/2009 | Petrovic et al. | .............. | 370/331 |
| 2009/0239533 A1* | 9/2009 | Somasundaram et al. | ..... | 455/434 |
| 2010/0022250 A1* | 1/2010 | Petrovic et al. | .............. | 455/450 |
| 2010/0093386 A1* | 4/2010 | Damnjanovic et al. | ....... | 455/522 |

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.6.0, Sep. 2009, 137 pgs.

"3$^{rd}$ Generation Partnership Project; Technical Specification Group Radio Access Network; Evolved Universal Terrestrial Radio Access (E-UTRA) Radio Resource Control (RRC); Protocol specification (Release 8)", 3GPP TS 36.331, V8.4.0, Dec. 2008, 198 pgs.

"LS on L1 Parameters in Random Access Response", 3GPP TSG-RAN WG2 Meeting, #59bix, Shanghai, China, Oct. 8-12, 2007, R2-074574, 2 pages.

* cited by examiner

| PROCEDURE TITLE: | E-UTRAN -> UE | UE -> E-UTRAN | N | NOTES |
|---|---|---|---|---|
| RRC CONNECTION CONTROL PROCEDURES | | | | |
| RRC CONNECTION ESTABLISHMENT | RRCConnectionSetup | RRCConnectionSetupComplete | 15 | |
| RRC CONNECTION RELEASE | RRCConnectionSetup Release | | NA | |
| RRC CONNECTION RECONFIGURATION (RADIO RESOURCE CONFIGURATION) | RRCConnection Reconfiguration | RRCConnection ReconfigurationComplete | 15 | |
| RRC CONNECTION RECONFIGURATION (MEASUREMENT CONFIGURATION) | RRCConnection Reconfiguration | RRCConnection ReconfigurationComplete | 15 | |
| RRC CONNECTION RECONFIGURATION (INTRA-LTE MOBILITY) | RRCConnection Reconfiguration | RRCConnection ReconfigurationComplete | 15 | |
| RRC CONNECTION REESTABLISHMENT | RRCConnection Reestablishment | RRCConnection ReestablishmentComplete | 15 | |
| INITIAL SECURITY ACTIVATION | SecurityMode Command | SecurityModeCommandComplete/ SecurityModeCommandFailure | 10 | |
| INITIAL SECURITY ACTIVATION + RRC CONNECTION RECONFIGURATION (RB ESTABLISHMENT) | SecurityModeCommand, RRCConnection Reconfiguration | RRCConnection ReconfigurationComplete | 20 | THE TWO DL MESSAGES ARE TRANSMITTED IN THE SAME TTI |
| PAGING | PAGING | | NA | |
| INTER RAT MOBILITY | | | | |
| HANDOVER TO E-UTRA | RRCConnection Reconfiguration (sent by other RAT) | RRCConnection ReconfigurationComplete | NA | |
| HANDOVER FROM E-UTRA | MobilityFromEUTRA Command | | NA | |
| HANDOVER FROM E-UTRA TO CDMA2000 | HandoverFromEUTRA PreparationRequest (CDMA 2000) | | NA | USED TO TRIGGER THE HANDOVER PREPARATION PROCEDURE WITH A CDMA2000 RAT |
| MEASUREMENT PROCEDURES | | | | |
| MEASUREMENT REPORTING | | MeasurementReport | NA | |
| OTHER PROCEDURES | | | | |
| UE CAPABILITY TRANSFER | UECapabilityEnquiry | UECapabilityInformation | 10 | |

FIG. 1D
PRIOR ART

OPTIMIZATION OF UPLINK RESOURCE GRANT PROCEDURE AND APPARATUS

TECHNICAL FIELD

The exemplary and non-limiting embodiments of this invention relate generally to wireless communication systems, methods, devices and computer programs and, more specifically, relate to layer 2 protocol functionality, in particular radio resource control protocol functionality and signaling.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledge
BW bandwidth
DL downlink (eNB towards UE)
DRX discontinuous reception
eNB EUTRAN Node B (evolved Node B)
ECM evolved packet system connection management
EPC evolved packet core
EPS evolved packet system
EUTRAN evolved UTRAN (LTE)
CDM code division multiplexing
FDMA frequency division multiple access
LTE long term evolution
MAC medium access control
MM/MME mobility management/mobility management entity
NACK negative acknowledge
NAS non-access stratum
Node B base station
OFDMA orthogonal frequency division multiple access
O&M operations and maintenance
PDCCH physical downlink control channel
PDCP packet data convergence protocol
PDU protocol data unit
PHY physical
RACH random access channel
RB radio bearer
RLC radio link control
RRC radio resource control
SGW serving gateway
SC-FDMA single carrier, frequency division multiple access
SR scheduling request
TDD time division duplex
TTI transmission time interval
UE user equipment
UL uplink (UE towards eNB)
UTRAN universal terrestrial radio access network The specification of a communication system known as evolved UTRAN (EUTRAN, also referred to as UTRAN-LTE or as EUTRA) is currently nearing completion within the 3GPP. As specified the DL access technique is OFDMA, and the UL access technique is SC-FDMA.

One specification of interest is 3GPP TS 36.300, V8.6.0 (2008-09), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety.

FIG. 1A reproduces Figure 4-1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
measurement and measurement reporting configurations to provide mobility and scheduling.

FIG. 1B reproduces Figure 4.3.2-1 of 3GPP TS 36.300, and shows the control plane protocol stack. As is described in 3GPP TS 36.300, the PDCP sublayer (terminated in the eNB on the network side) performs the functions listed for the control plane in subclause 6 of 3GPP TS 36.300, e.g., ciphering and integrity protection and the RLC and MAC sublayers (terminated in the eNB on the network side) perform the same functions as for the user plane. Of more interest herein, the RRC (also terminated in the eNB on the network side) performs the functions listed in subclause 7 of 3GPP TS 36.300, e.g., broadcast, paging, RRC connection management, RB control, mobility functions and UE measurement reporting and control. The NAS control protocol (terminated in the MME on the network side) performs, among other things, EPS bearer management, authentication, ECM-IDLE mobility handling, paging origination in ECM-IDLE and security control.

Another specification of particular interest to the RRC protocol layer is 3GPP TS 36.331, V8.4.0 (2008-12), 3rd Generation Partnership Project; Technical Specification Group Radio Access Network; Evolved Universal Terrestrial Radio Access (EUTRA); Radio Resource Control (RRC); Protocol specification (Release 8), also incorporated by reference herein in its entirety.

Currently the E-UTRAN specifications specify that whenever the UE needs to make an UL transmission it is required to request UL resources either by using a SR, if the PDCCH is configured, or by initiating a random access procedure.

As is also currently specified in 3GPP TS 36.331, the RRC (the UE) should perform all needed activities within a certain pre-defined time Reference may be made to R2-090820, 3GPP TSG-RAN WG2 Meeting #64-bis, Jan. 12-16, 2009, Qualcomm Europe, "RRC processing delay", which is a change request (CR) for sub-clause 11.2, "Processing delay requirements for RRC procedures" of 3GPP 36.331. FIG. 1C herein reproduces the proposed Figure 11.2-1 from R2-090820 and is an illustration of the RRC procedure delay. FIG. 1D herein reproduces a Table from R2-090820 and shows the value of N for various RRC procedures. Note that the particular given values are subject to change.

As is stated, the UE performance requirements for RRC procedures are specified in the Table, reproduced in FIG. 1D, by means of the value N, where N is equal to the number of 1 ms subframes from the end of reception of the E-UTRAN→UE message on the UE physical layer up to when the UE shall be ready for the reception of the UL grant for the UE→E-UTRAN response message, with no access delay other than the TTI-alignment (e.g., excluding delays caused by scheduling, the random access procedure or physical layer synchronization).

SUMMARY

The foregoing and other problems are overcome, and other advantages are realized, by the use of the exemplary embodiments of this invention.

In a first aspect thereof the exemplary embodiments of this invention provide a method that comprises receiving a radio resource control message for which a response message is required to be transmitted to a network access node; performing at least one procedure specified by the radio resource control message; and transmitting the response message using network radio resources that are received in a non-solicited manner from the network access node.

In another aspect thereof the exemplary embodiments of this invention provide a computer-readable memory that stores program instructions, where the execution of the program instructions results in performing operations that comprise receiving a radio resource control message for which a response message is required to be transmitted to a network access node; performing at least one procedure specified by the radio resource control message; and transmitting the response message using network radio resources that are received in a non-solicited manner from the network access node.

In a further aspect thereof the exemplary embodiments of this invention provide an apparatus that comprises a controller configured to operate with a radio frequency receiver and a radio frequency transmitter. The controller is further configured to receive a radio resource control message for which a response message is required to be transmitted to a network access node, to perform at least one procedure specified by the radio resource control message and to transmit the response message using network radio resources that are received in a non-solicited manner from the network access node.

In yet another aspect thereof the exemplary embodiments of this invention provide an apparatus that comprises a controller configured to operate with a radio frequency receiver and a radio frequency transmitter. The controller is further configured to transmit a radio resource control message for which a response message is required to be received from a user equipment, and to specify to the user equipment in an un-solicited manner those network radio resources to be used by the user equipment for transmitting the response message.

In a still further aspect thereof the exemplary embodiments of this invention provide a method that comprises transmitting a radio resource control message for which a response message is required to be received from a user equipment, and specifying to the user equipment in an un-solicited manner those network radio resources to be used by the user equipment for transmitting the response message.

In another aspect thereof the exemplary embodiments of this invention provide a computer-readable memory that stores program instructions, where the execution of the program instructions results in performing operations that comprise transmitting a radio resource control message for which a response message is required to be received from a user equipment, and specifying to the user equipment in an un-solicited manner those network radio resources to be used by the user equipment for transmitting the response message.

BRIEF DESCRIPTION OF THE DRAWINGS

In the attached Drawing Figures:

FIG. 1D reproduces the Table from R2-090820 and shows the value of N for various RRC procedures.

DETAILED DESCRIPTION

As currently specified the RRC processing delay requirement does not provide the eNB with exact knowledge of when the UE is capable of sending a response message. This can result in the UE beginning to request UL resources via the RACH/SR, even though the network (eNB) would be capable of allocating resources to the UE. This is clearly then a waste of the valuable and limited RACH resources.

The exemplary embodiments of this invention address and solve this and other problems, as described in detail below.

Figure 1A:
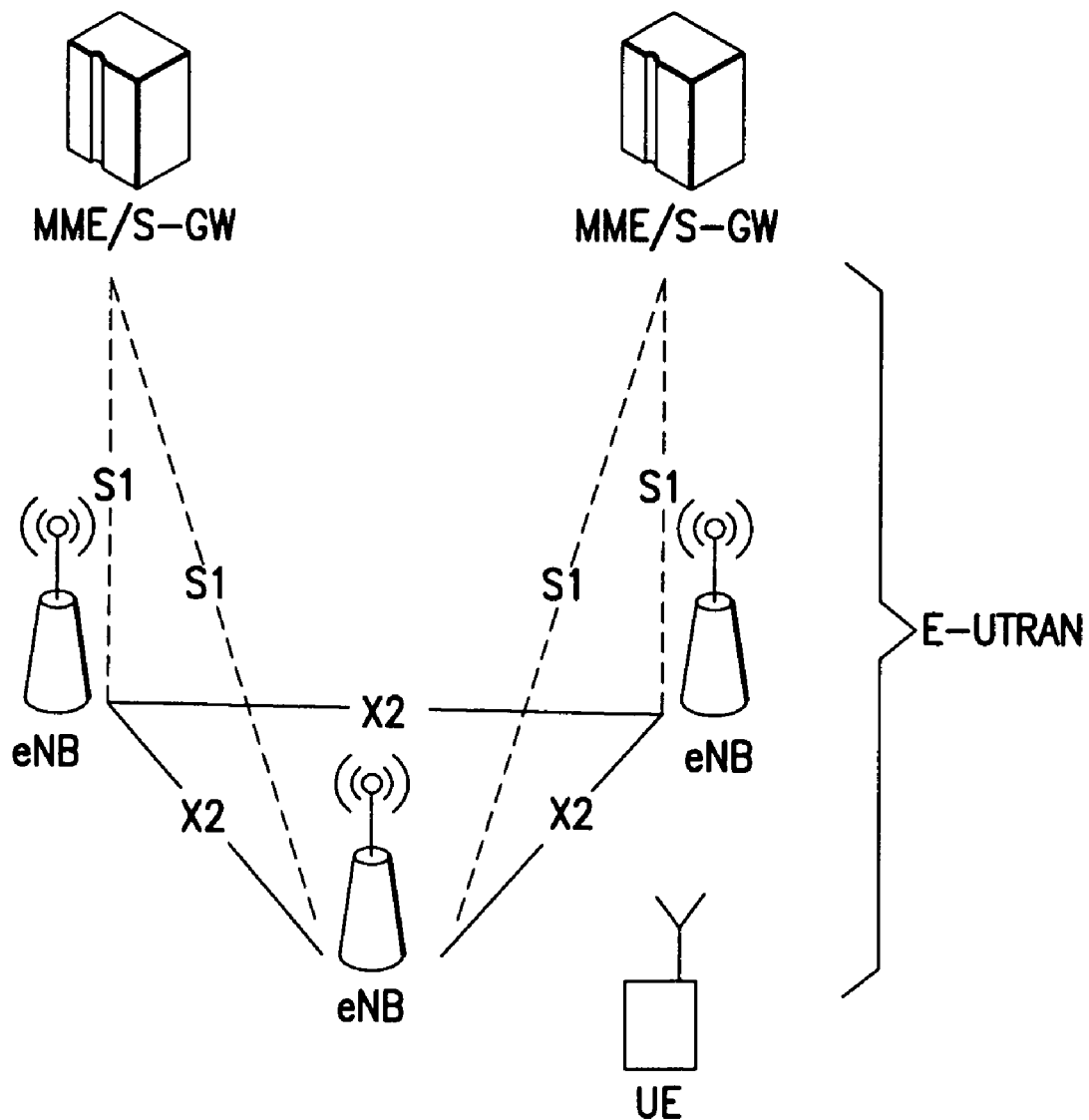
FIG. 1A reproduces FIG. 4-1 of 3GPP TS 36.300, and shows the overall architecture of the EUTRAN system.
Figure 2A:
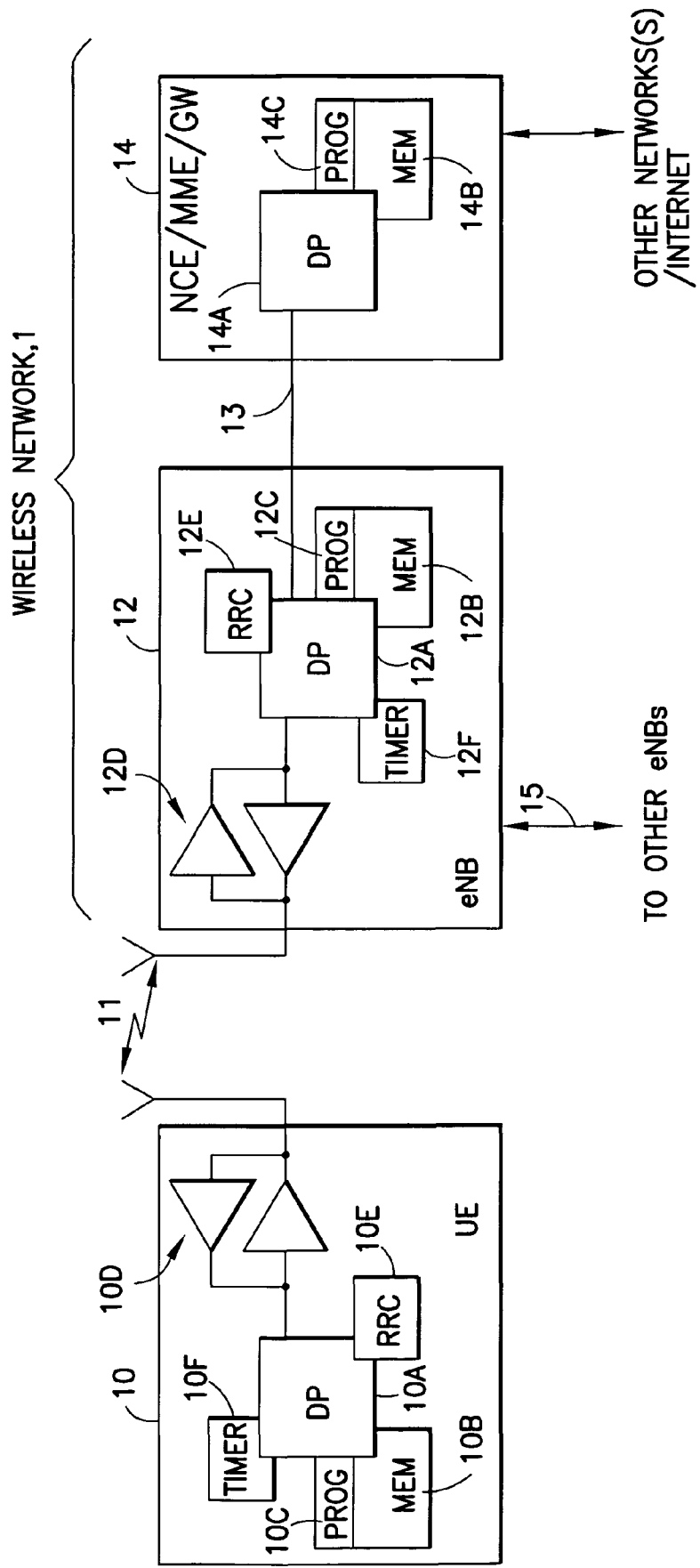
FIG. 2A shows a simplified block diagram of various electronic devices that are suitable for use in practicing the exemplary embodiments of this invention.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

Figure 1B:
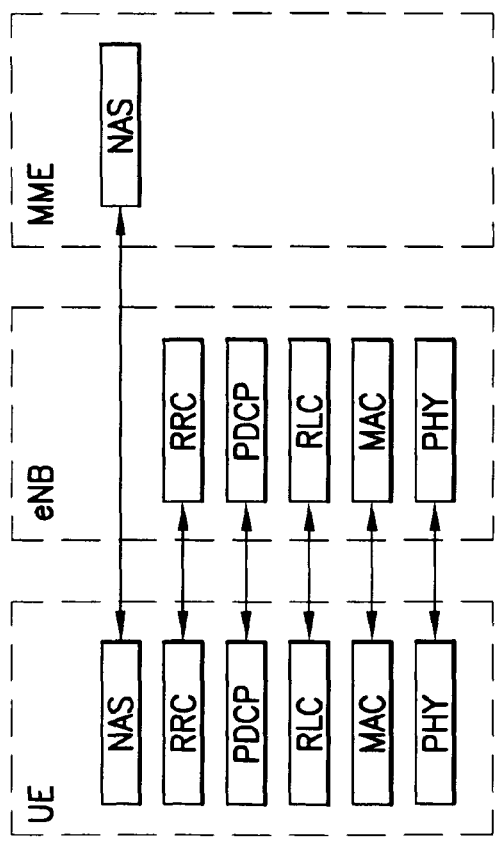
FIG. 1B reproduces FIG. 4.3.2-1 of 3GPP TS 36.300, and shows the control plane protocol stack.
Figure 1C:
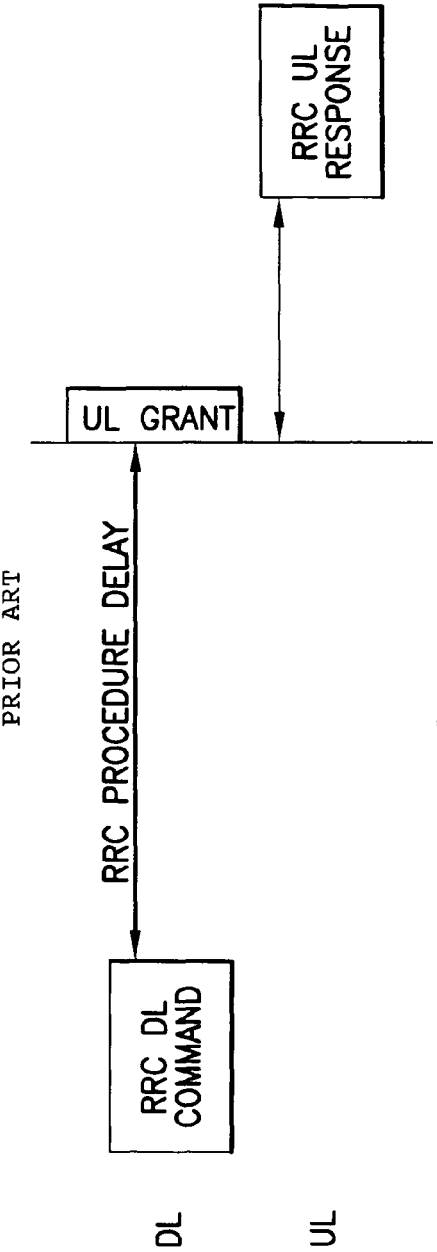
FIG. 1C proposed FIG. 11.2-1 from R2-090820 and is an illustration of the RRC procedure delay.

For the purposes of describing the exemplary embodiments of this invention the UE 10 may be assumed to also include a RRC functional unit 10E, and the eNB 12 may be assumed to include a complementary RRC functional unit 12E (as was also shown in FIG. 1 B). The RRC functional units 10E, 12E are configured to operate in accordance with the exemplary embodiments of this invention, as described in detail below.

At least one of the PROGs 10C and 12C is assumed to include program instructions that, when executed by the associated DP, enable the device to operate in accordance with the exemplary embodiments of this invention, as will be discussed below in greater detail. In general, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 2B:
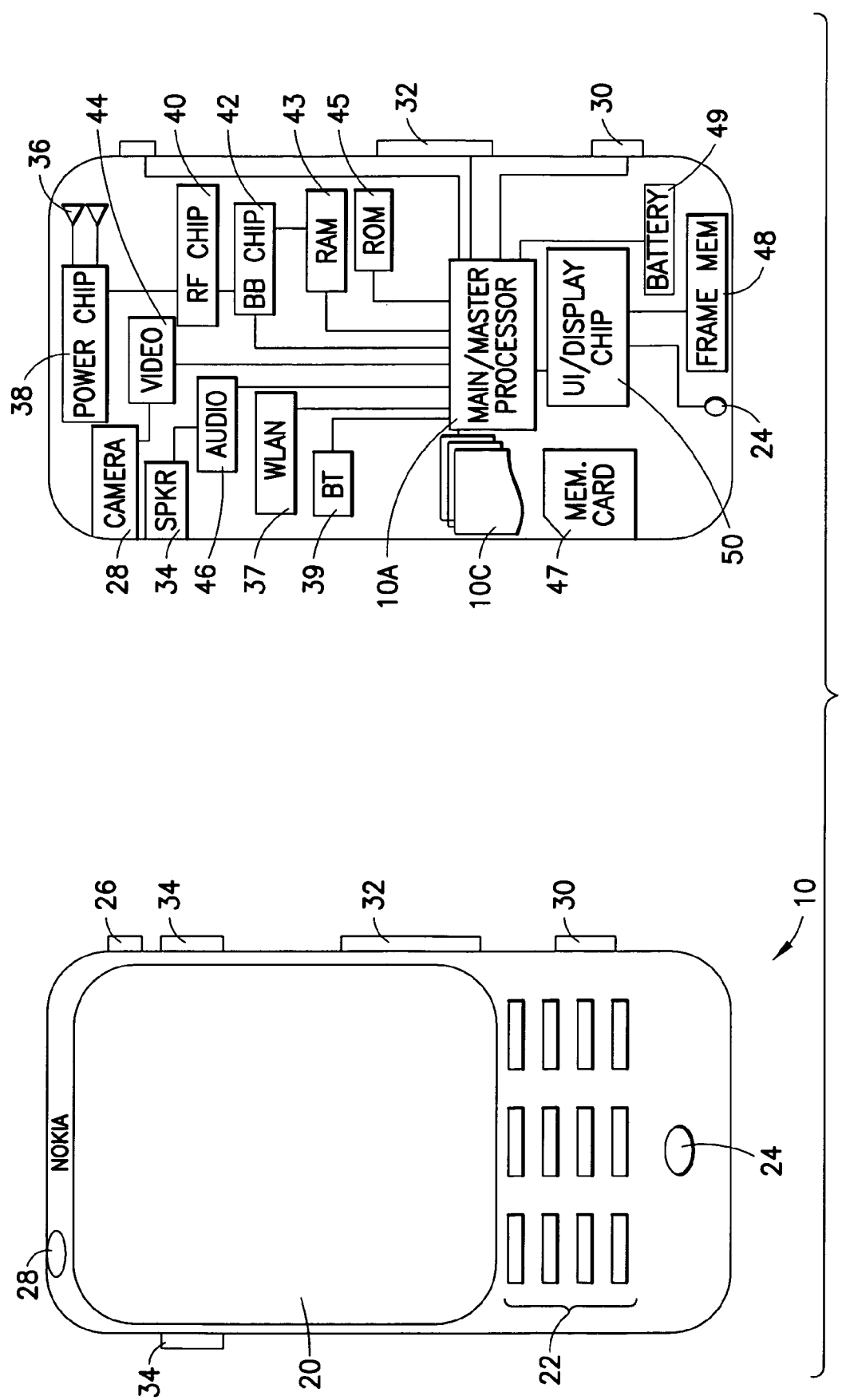
FIG. 2B shows a more particularized block diagram of a user equipment such as that shown at FIG. 2A.
Figure 3:
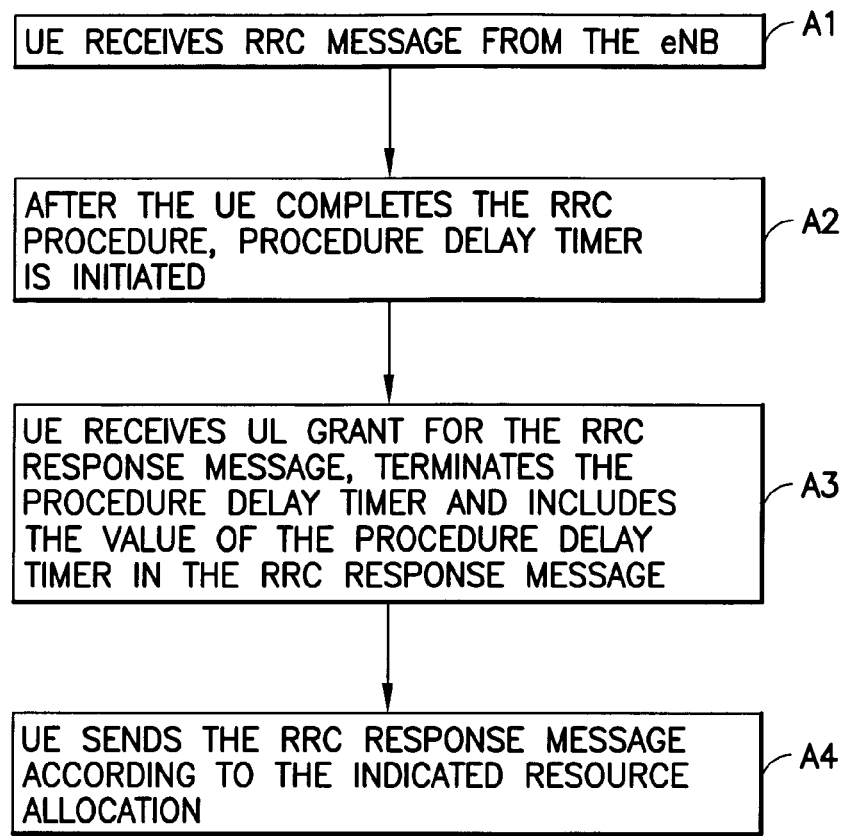
FIGS. 3, 4, 5 and 6 are each a logic flow diagram that illustrates the operation of a method, and a result of execution of computer program instructions embodied on a computer readable memory, in accordance with various exemplary embodiments of this invention.
Figure 4:
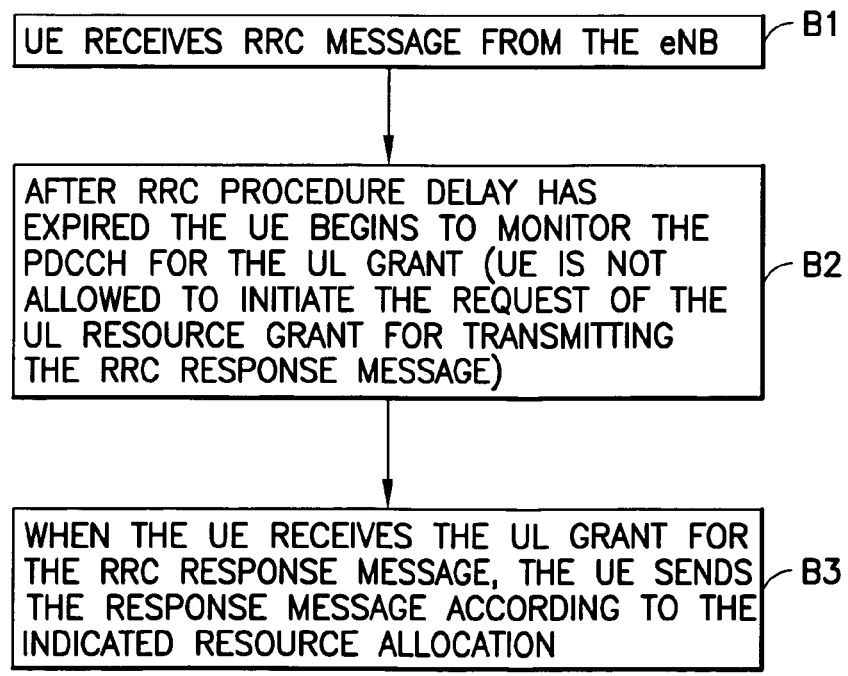
Figure 5:
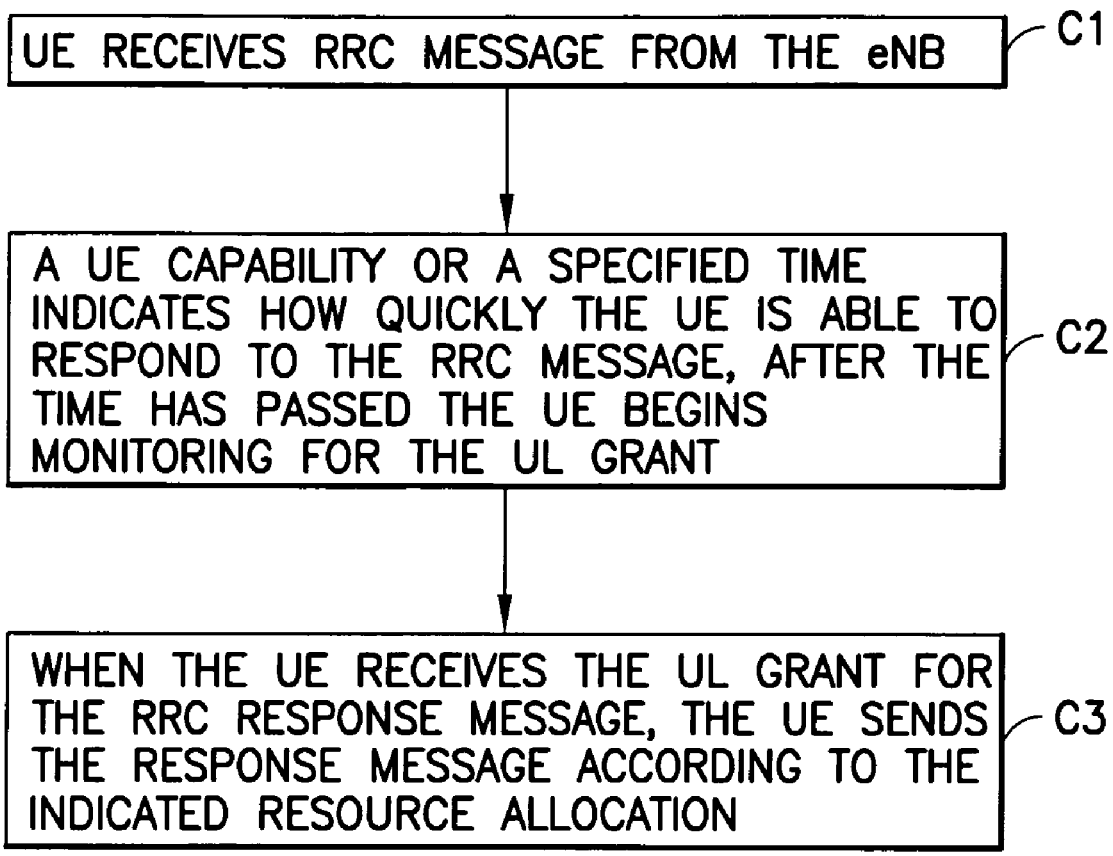
Figure 6:
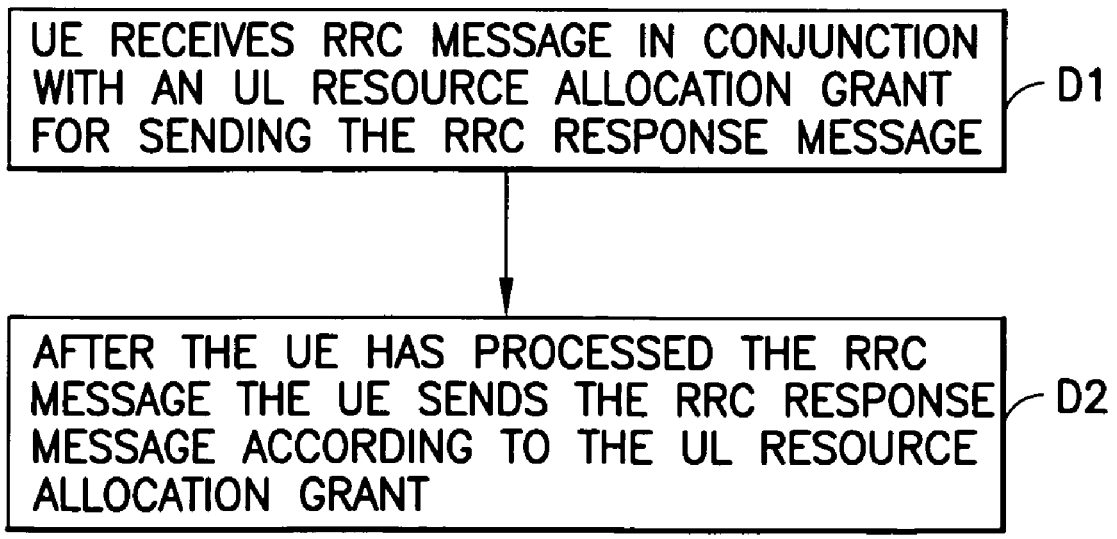

FIG. 2B illustrates further detail of an exemplary UE 10 in both plan view (left) and sectional view (right), and the invention may be embodied in one or some combination of those more function-specific components. At FIG. 2B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage).

The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 2B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and downconverts the signal for baseband processing. The baseband (BB) chip 42 detects the signal which is then converted to a bit stream and finally decoded. Similar processing occurs in reverse for signals generated in the apparatus 10 and transmitted from it.

Signals going to and from the camera 28 may pass through an image/video processor 44 that encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on the chip or be coupled to an antenna off the chip. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be disposed across various chips and memories as shown, or disposed within another processor that combines some of the functions described above for FIG. 2B. Any or all of these various processors of FIG. 2B access one or more of the various memories, which may be on chip with the processor or separate there from. Similar function-specific components that are directed toward communications over a network broader than a piconet (e.g., components 36, 38, 40, 42-45 and 47) may also be disposed in exemplary embodiments of the access node 12, which may have an array of tower mounted antennas rather than the two shown at FIG. 2B.

Note that the various integrated circuits (e.g., chips 38, 40, 42, etc.) that were described above may be combined into a fewer number than described and, in a most compact case, may all be embodied physically within a single chip.

The exemplary embodiments of this invention utilize predefined RRC procedure delay requirements in UL resource granting by the network, without a need to separately request them by the UE 10, and also allow the network to adapt to present conditions, e.g., to adjust the granting of UL resources according to certain rules/procedures.

Four exemplary embodiments are described below, referred to for convenience as embodiments A, B, C and D and shown in FIGS. 3, 4, 5 and 6, respectively. These embodiments may be summarized as having the following common elements: (a) the avoidance of unnecessary SRs from the UE 10, and (b) the automatic allocation of UL resources to the UE 10 by the eNB 12 by utilizing predefined RRC procedure delay requirements.

There are presently specified a number of RRC messages to which a UE 10 response message is also defined. For example, reference can be made to sub-clause 6.2.1, "General message structure" of 3GPP 36.331, and to sub-clause 6.2.2, "Message definitions". Several non-limiting examples of RRC messages include:
CounterCheck,
RRCConnectionReconfiguration,
RRCConnectionReestablishment, and
RRCConnectionSetup.

Embodiment A (FIG. 3):

A1. The UE 10 receives a RRC message from the eNB 12.

A2. When the UE 10 has completed its procedures in response to the received RRC message, and is ready to receive an UL grant for sending the response message to the eNB 12, it initiates a procedure delay timer 10F (which may be a MAC/L2 hardware or software-based timer). During this time the UL grant is sent from eNB 12 to the UE 10 to inform the UE of the UL resource allocation.

A3. When the UE 10 receives the UL grant for the response message, it terminates the timer 10F and includes the value of the timer 10F in the response message. As can be appreciated, the value of the procedure delay timer 10F reflects the amount of time (e.g., in milliseconds) that elapsed from the time that the UE 10 finished the RRC procedure and was prepared to send the response message, and the time that the eNB 12 actually provided the UL resource allocation for sending the response message. The eNB 12 after it receives the response message and extracts the value of the procedure delay timer 10F may use the extracted value to adjust the sending of the UL grant for a next occasion, and to adapt to the current conditions. It should be noted that the UE 10 may independently begin requesting UL resources if seen as necessary, i.e., the timer 10F (MAC/L1 level) may be started and run, even though the UE 10 requests the UL resource itself, and stopped when the UL grant is received from the eNB 12.

A4. The UE 10 sends the RRC response message, which includes the timer value, according to the allocation indicated in the UL grant.

It should be noted that a SR needed for another reason (than requesting UL resources for sending the RRC response message) may be allowed even while the timer 10F is running

Embodiment B (FIG. 4):

B1. The UE 10 receives a RRC message from the eNB 12. Note, however, that in this embodiment the UE 10 is not allowed to initiate the request of the UL resources for transmitting the RRC response message B2. After the RRC procedure delay (e.g., fixed in the specification) has expired (which may be indicated using a different (RRC/L3) timer) the UE 10 begins to listen to the PDCCH for the UL grant. Depending on preferences the UE 10 may listen to the PDCCH for, as three non-limiting examples, a period of one subframe, or until the UL grant is received, or for some predefined duration of time.

B3. When the UE 10 receives the UL grant for the response message, the UE 10 sends the RRC response message according to the resource allocation indicated in the UL grant.

It can be noted that in this embodiment the UE 10 is not allowed to use the presently specified mechanisms for requesting UL resources for sending the RRC response. Instead, the network (the eNB 12) autonomously performs the allocation. In this case the procedure delay timer may also be implemented in the eNB 12 as the timer 12F to ensure that the eNB 12 does not allocate the UL resources prematurely. Additionally, if there is no data transfer ongoing the UE 10 may perform a power consumption optimization, such as by entering the DRX mode after reception of the RRC message, up to the point where it should begin listening for an UL grant for the response message.

Embodiment C (FIG. 5):

C1. The UE 10 receives a RRC message from the eNB 12.

C2. There exists a UE 10 capability (or a specified time in the specification) that indicates how quickly the UE 10 is able to respond to the RRC message. The eNB 12 can utilize this information in a resource allocation strategy. After the time has passed the UE 10 begins monitoring the PDCCH for the UL grant. As in embodiment B, and depending on preferences, the UE 10 may listen to the PDCCH for, as three non-limiting examples, a period of one subframe, or until the UL grant is received, or for some predefined duration of time. If the eNB 12 does not allocate the UL resources the UE 10 may begin to request UL resources via a normal resource request procedures, e.g., by using a SR or the RACH. A UE capability signaling procedure can be found in sub-clause 5.6.3, "UE capability transfer" in 3GPP 36.331, where the UE responds to a UECapabilityEnquiry with UECapabilityInformation. Note that it is also possible for the eNB 12 to receive the UE 10 capabilities from the MME (shown in FIG. 1A).

C3. When the UE 10 receives the UL grant for the response message, the UE 10 sends the response message according to the resource allocation indicated in the UL grant.

Embodiment D (FIG. 6):

D1. The UE 10 receives a RRC message with an UL grant in the same transport block wherein RRC message is sent to the UE 10. The UL grant may be in the RRC message. Alternatively, the UL grant may be given in MAC/RLC signaling in the same transport block as the RRC message.

D2. After the UE 10 has processed the RRC message the UE 10 sends the response message according to the UL allocation indicated in D1.

Note that a similar UL grant mechanism may be used for RLC ACK sending. For example, the network (eNB 12) may give in conjunction with a polled RLC PDU an UL grant for sending the RLC ACK/NACK message.

In view of the foregoing it can be appreciated that the exemplary embodiments of this invention utilize predefined RRC procedure delay requirements for UL resource granting, without the need to separately request UL resources by the UE 10, while also allowing the network to adapt to present conditions, e.g., adjust the granting of UL resources according to certain rules/procedures. By the use of these exemplary embodiments the UE 10 does not need to employ a complex random access procedure to obtain a grant of UL resources, and the eNB 12 can avoid receiving unnecessary SRs from the UE 10.

The UE 10 is not required to send the SR to the eNB 12, nor use the RACH procedure. The eNB 12 may automatically allocate UL resources based on predefined RRC procedure delay requirements, without receiving an explicit request from the UE 10.

In these various embodiments the UE 10 transmits the RRC response message to the eNB 12 using network radio resources that are received in a non-solicited manner from the eNB 12 (i.e., without being expressly requested by the UE 10).

In embodiment A above the UE 10 waits for the UL grant for the transmission of the RRC response message, without sending the SR to obtain the UL resource grant, where the waiting time is based on the procedure delay timer 10F.

In embodiment B above the sending of the SR is not allowed by the UE 10. Instead, after the predefined RRC procedure delay timer has expired, the UE 10 begins to listen to the PDCCH for the UL grant.

In embodiment C above the UE 10 waits for expiration of a UE capability-dependent time (or a specification-defined time), and the eNB 12 sends the UL resource grant to the UE 10 taking into account this time.

In embodiment D above the UL grant for the RRC response message is provided with the DL RRC message.

The use of one or more of these exemplary embodiments provides a number of advantages and technical effects. For example, the use of one or more of these exemplary embodiments of the invention can have a significant impact on the air interface usage, as it reduces significantly the need for separate resource request methods (e.g., SRs and random access procedures, where at least the latter causes additional interference in the air interface).

Based on the foregoing it should be apparent that the exemplary embodiments of this invention provide a method, apparatus and computer program(s) to reduce an amount of uplink signaling and, more specifically, to reduce the sending of service requests from a mobile device, and also use of a random access channel.

Figure 7:
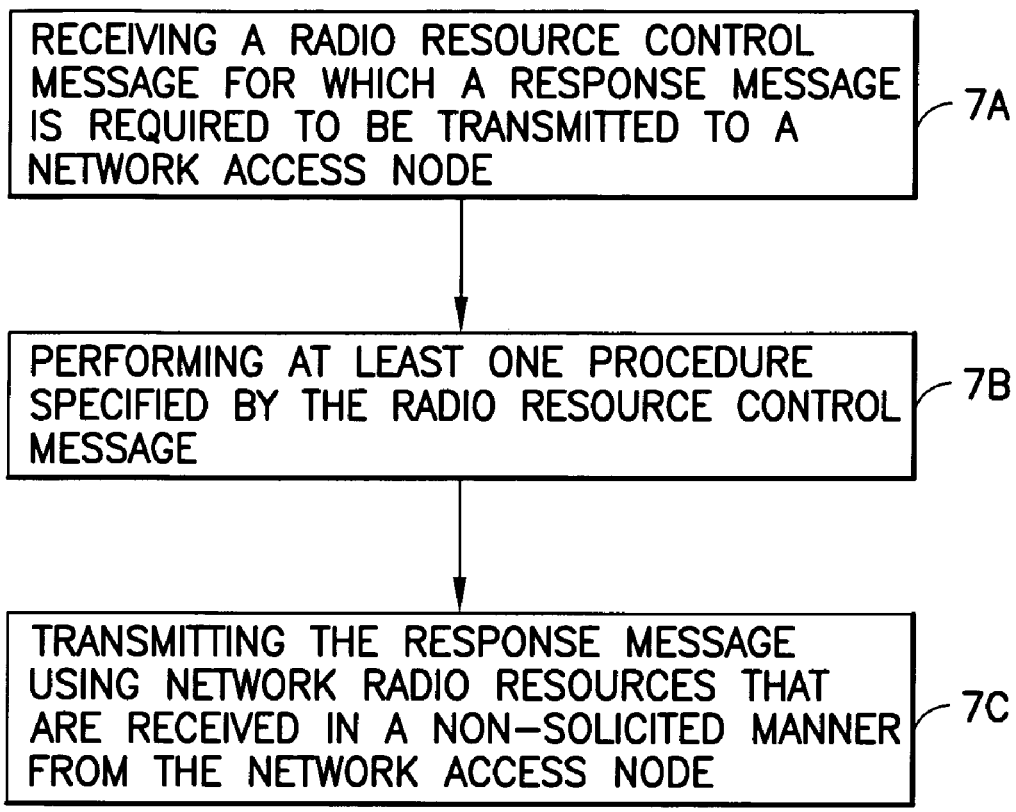
FIGS. 7 and 8 are each a logic flow diagram that illustrates the operation of a method, and a result of execution of computer program instructions embodied on a computer readable memory, further in accordance with the various exemplary embodiments of this invention.

(A) FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of receiving a radio resource control message for which a response message is required to be transmitted to a network access node. At Block 7B there is a step of performing at least one procedure specified by the radio resource control message. At Block 7C there is a step of transmitting the response message using network radio resources that are received in a non-solicited manner from the network access node.

(B) In accordance with the method, and the execution of the computer program instructions of the preceding paragraph, where performing the at least one procedure comprises initiating operation of a timer, and further comprises receiving a specification of the network radio resources from the network access node; terminating operation of the timer; and transmitting the response message using the specified network radio resources, where the response message includes a value of the timer when operation of the timer is terminated.

(C) In accordance with the method, and the execution of the computer program instructions of paragraph (A), where performing the at least one procedure comprises delaying for a predetermined period of time after performing the at least one procedure, and further comprises beginning to monitor a downlink control channel for a specification of the network radio resources from the network access node, and transmitting the response message using the specified network radio resources.

(D) In accordance with the method, and the execution of the computer program instructions of paragraph (A), where the predetermined period of time is configured to be a radio resource control procedure delay period.

(E) In accordance with the method, and the execution of the computer program instructions of paragraph (C), where the predetermined period of time is configured to be equal to a user equipment capability to respond to the radio resource control message.

(F) In accordance with the method, and the execution of the computer program instructions of paragraph (A), where receiving the radio resource control message comprises simultaneously receiving the specification of the network radio resources.

Figure 8:
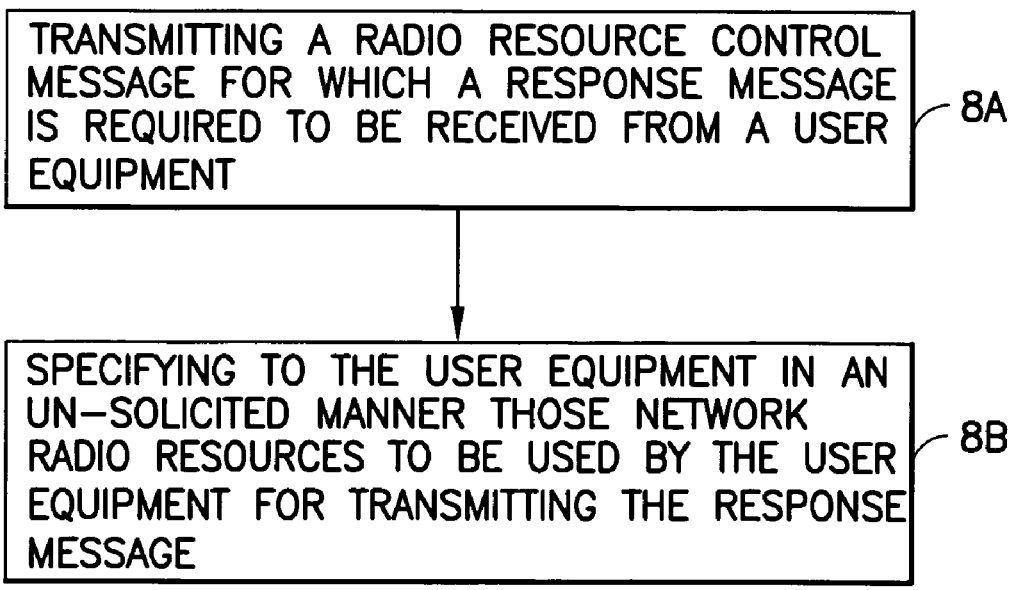

(A) FIG. 8 is a logic flow diagram that illustrates the operation of a method, and a result of execution of computer program instructions, further in accordance with the exemplary embodiments of this invention. In accordance with these exemplary embodiments a method performs, at Block 8A, transmitting a radio resource control message for which a response message is required to be received from a user equipment and, at Block 8B, specifying to the user equipment in an un-solicited manner those network radio resources to be used by the user equipment for transmitting the response message.

(B) In accordance with the method, and the execution of the computer program instructions of the preceding paragraph, where specifying comprises transmitting a specification of the radio resources simultaneously with the radio resource control message.

(C) In accordance with the method, and the execution of the computer program instructions of the preceding paragraph (A), where specifying comprises transmitting a specification of the radio resources subsequent to a delay period after transmitting the radio resource control message, where the delay period is one of predetermined or based at least in part on information received from the user equipment.

The various blocks shown in FIGS. 3-8 may be viewed as method steps, and/or as operations that result from operation of computer program code, and/or as a plurality of coupled logic circuit elements constructed to carry out the associated function(s).

The exemplary embodiments of this invention also encompass an apparatus that comprises means for receiving a radio resource control message for which a response message is required to be transmitted to a network access node; means for performing at least one procedure specified by the radio resource control message; and means for transmitting the response message using network radio resources that are received in a non-solicited manner from the network access node.

In the apparatus the performing means may be configured to initiate operation of a timer means, and further comprises means for receiving a specification of the network radio resources from the network access node; and means for terminating operation of the timer means. The transmitting means transmits the response message using the specified network radio resources, where the response message includes a value of the timer means when operation of the timer means is terminated.

In the apparatus the performing means may delay for a predetermined period of time after performing the at least one procedure, and further comprises means for monitoring a downlink control channel for a specification of the network radio resources from the network access node, and where the transmitting means transmits the response message using the specified network radio resources. In the apparatus the predetermined period of time may be configured to be equal to one of a radio resource control procedure delay period or a user equipment capability to respond to the radio resource control message.

In the apparatus the receiving means may be configured to receive the specification of the network radio resources with the radio resource control message.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems. For example, these exemplary embodiments may be employed as well with enhancements to LTE, such as in LTE-Advanced that is currently being specified.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., 'procedure delay timer', etc.) are not intended to be limiting in any respect, as these parameters may be identified by any suitable names. Further, the various names assigned to different channels (e.g., PDCCH, RACH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving a radio resource control message for which a response message is required to be transmitted to a network access node;
   performing at least one procedure specified by the radio resource control message;
   initiating operation of a timer;
   receiving a specification of the network radio resources from the network access node;
   terminating operation of the timer; and
   transmitting the response message using the specified network radio resources, wherein the response message includes a value of the timer when operation of the timer is terminated.

2. A method, comprising:
   receiving a radio resource control message for which a response message is required to be transmitted to a network access node;
   performing at least one procedure specified by the radio resource control message, wherein performing the at least one procedure comprises delaying for a predetermined period of time after performing the at least one procedure;
   beginning to monitor a downlink control channel for a specification of the network radio resources from the network access node; and
   transmitting the response message using the specified network radio resources.

3. The method of claim 2, wherein the predetermined period of time is configured to be a radio resource control procedure delay period.

4. The method of claim 2, wherein the predetermined period of time is configured to be equal to a user equipment capability to respond to the radio resource control message.

5. An apparatus, comprising a controller configured to operate with a radio frequency receiver and a radio frequency transmitter, said controller further configured to receive a radio resource control message for which a response message is required to be transmitted to a network access node, said controller further configured to perform at least one procedure specified by the radio resource control message and to transmit the response message using network radio resources that are received in a non-solicited manner from the network access node, the apparatus further comprising a timer, said controller being further configured to initiate operation of the timer when performing the at least one procedure, to receive a specification of the network radio resources from the network access node and in response to terminate operation of the timer and to transmit the response message using the specified network radio resources, wherein the response message comprises a value of the timer when operation of the timer is terminated.

6. An apparatus, comprising a controller configured to operate with a radio frequency receiver and a radio frequency transmitter, said controller further configured to receive a radio resource control message for which a response message is required to be transmitted to a network access node, said controller further configured to perform at least one procedure specified by the radio resource control message and to transmit the response message using network radio resources that are received in a non-solicited manner from the network access node, wherein said controller, when performing the at least one procedure, is further configured to delay for a predetermined period of time after performing the at least one procedure, to begin to monitor a downlink control channel for a specification of the network radio resources from the network access node and to transmit the response message using the specified network radio resources.

7. The apparatus of claim 6, where the predetermined period of time is configured to be a radio resource control procedure delay period, or is configured to be equal to a user equipment capability to respond to the radio resource control message.

8. An apparatus, comprising a controller configured to operate with a radio frequency receiver and a radio frequency transmitter, said controller further configured to transmit a radio resource control message for which a response message is required to be received from a user equipment, said controller further configured to specify to the user equipment in an un-solicited manner those network radio resources to be used by the user equipment for transmitting the response message, wherein said controller transmits a specification of the radio resources subsequent to a delay period after transmitting the radio resource control message, wherein the delay period is one of predetermined or based at least in part on information received from the user equipment.

9. A method, comprising:
   transmitting a radio resource control message for which a response message is required to be received from a user equipment; and
   specifying to the user equipment in an un-solicited manner those network radio resources to be used by the user equipment for transmitting the response message, wherein specifying comprises transmitting a specification of the radio resources subsequent to a delay period after transmitting the radio resource control message, wherein the delay period is one of predetermined or based at least in part on information received from the user equipment.

10. A non-transitory computer-readable medium configured with program instructions, the program instructions together with at least one memory and at least one processor, configured to cause an apparatus to:
   receive a radio resource control message for which a response message is required to be transmitted to a network access node;
   perform at least one procedure specified by the radio resource control message;
   initiate operation of a timer;
   receive a specification of the network radio resources from the network access node;
   terminate operation of the timer; and
   transmit the response message using the specified network radio resources, wherein the response message includes a value of the timer when operation of the timer is terminated.

11. A non-transitory computer-readable medium configured with program instructions, the program instructions together with at least one memory and at least one processor, configured to cause an apparatus to:
   receive a radio resource control message for which a response message is required to be transmitted to a network access node;
   perform at least one procedure specified by the radio resource control message;
   delay for a predetermined period of time after performing the at least one procedure;
   monitor a downlink control channel for a specification of the network radio resources from the network access node; and
   transmit the response message using the specified network radio resources.

* * * * *